Jan. 28, 1936.　　　　　G. G. HEIN　　　　　2,028,905
JACK
Filed April 1, 1935
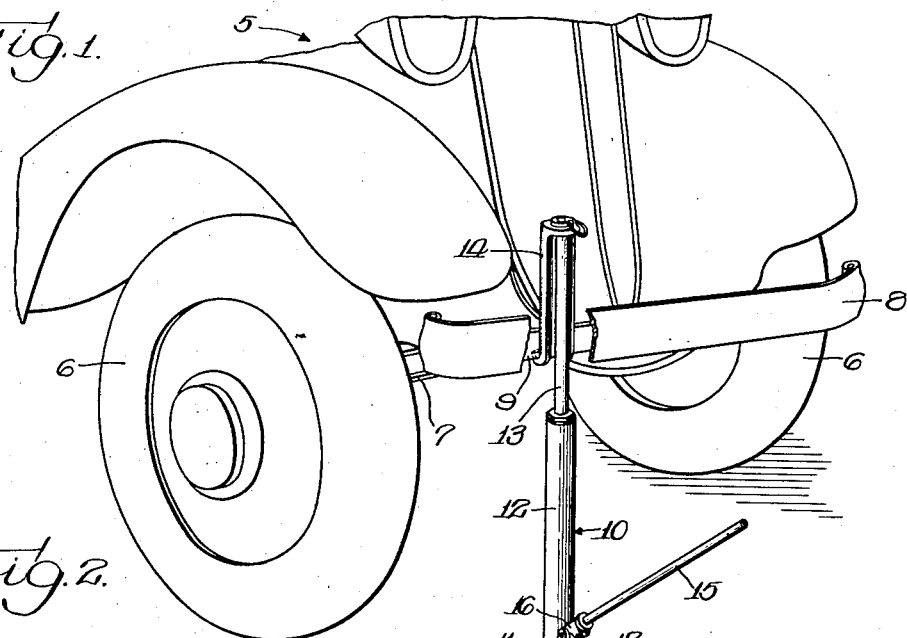
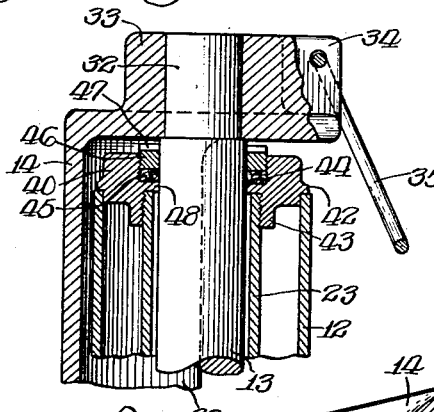
Inventor;-
Gothard G. Hein,
By Brown, Jackson, Boettcher & Diemer,
Attys.

Patented Jan. 28, 1936

2,028,905

UNITED STATES PATENT OFFICE 2,028,905

JACK

Gothard G. Hein, Waukesha, Wis., assignor to Hein-Werner Motor Parts Corporation, Waukesha, Wis., a corporation of Wisconsin Application April 1, 1935, Serial No. 14,106

15 Claims. (Cl. 254—93)

This invention relates to jacks, and more particularly is directed to a bumper jack of the hydraulic type, specifically adapted for use in jacking up automotive vehicles and the like, although it is to be understood that the invention is not limited to this specific use.

In the present day type of automotive vehicle, considerable overhang of the vehicle body, both at the front and rear of the chassis, is provided to produce the streamline effects now desired. Such overhang renders the placing of a jack under the axle of the vehicle, as was heretofore the general practice when it was desired to jack up the vehicle for changing a tire or the like, both inconvenient and impracticable.

The present invention provides a jack of the hydraulic type, provided with an axially extensible plunger member, which plunger member has secured to the upper end thereof an inwardly offset projection of a substantially arcuately shaped depending flanged member provided with a laterally projecting hook portion at the lower end thereof.

In the use of the type of jack disclosed herein, the hook portion of the flanged member is adapted to be engaged under a bumper bar or the extending horn of the channel of the chassis of the vehicle, and by rocking of the jacking lever the hydraulic pressure raises the plunger to produce corresponding raising of the hook, whereby the vehicle is first raised with respect to the axle assembly, and then the axle is raised by reason of the spring suspension thereof from the body of the vehicle. In this manner, the vehicle can be raised a sufficient distance from the ground to facilitate the changing of a tire or the like.

One of the important objects of the present invention is to provide a jack having considerable lifting height in order that the vehicle and axle assembly may be raised from the ground readily.

Another object of the present invention is to provide a jack construction wherein the plunger member is provided with means for preventing binding or shackling of the plunger within the plunger cylinder as the plunger moves toward its outermost position. This comprises a plunger spacer or cross head carried at the lower end of the plunger, which, in the construction where the outer hook arm is supported solely at the top of the plunger, provides an enlarged lower end portion which really supports the plunger when the jack is raised to its full height.

A still further object of the present invention is to provide a jack which is light in weight, can be readily placed in any desired position, and is designed to provide a compact unit that may be readily transported and which takes up little space when in storage.

Another advantage secured by the present invention is the provision of a jack wherein the raising force is applied at a point substantially centrally of the plunger member, so that there is little tendency for displacement of the jack from its vertical position, and the jack therefore has no force acting thereon tending to rock the same about its base.

A still further advantage of the present invention is the provision of a jack in which the plunger member is rotatable with respect to the jack, so that the hook portion carried by the plunger can be disposed in any desired position with respect to the angular position of the operating handle.

Another feature provided by the present invention is the provision of a hook member so formed as to readily engage any desired type of bar member, channel or flange for facilitating its positioning with respect to the member with which it is engaged for jacking purposes.

Other objects and advantages of the present invention will appear more fully from the following detailed description, which, taken in conjunction with the accompanying drawing, will disclose to those skilled in the art the particular construction and operation of a preferred embodiment of my invention.

In the drawing:

Figure 1 is a perspective view showing the jack as connected in position for raising the forward end of a vehicle;

Figure 2 is an elevational view of the jack, with a portion thereof broken away to show the internal construction of the operating mechanism;

Figure 3 is a sectional view, taken through the upper end of the jack, showing the manner in which the flanged hook member is supported upon the jack plunger; and Figure 4 is a horizontal sectional view taken substantially on line 4—4 of Figure 2, looking in the direction indicated by the arrows.

Referring now in detail to the drawing, in Figure 1 I have indicated an automotive vehicle by the general reference numeral 5, which vehicle is provided with wheels 6 supported upon an axle 7. The vehicle is also provided with a forwardly projecting bumper member 8, which bumper member comprises a front abutment bar, preferably formed of spring material or the like, as is well known, and a rear supporting bar 9 for connecting the forward bar to the projecting channel member of the vehicle, in a manner well known in the art.

In order to lift the forward end of the vehicle, since the overhanging portion of the fenders and radiator prevent ready access to the axle 7, I provide a jack member, indicated generally at 10, which jack member comprises a base portion 11, an external cylindrical member 12, an axially extensible plunger member 13, and a flanged hook member 14. The jack is operated by means of the rocking handle or operating member 15, which engages at its lower end in a suitable rocking beam 16 carried by the upwardly extending shoulder 17 formed integral with the base 11, and is provided with an offset extension 18 pivotally connected to a plunger member 19.

Referring now in detail to Figure 2, the base 11 is provided with a shouldered recess 20, which recess is adapted to provide a suitable support for the lower end 22 of the outer cylindrical member 12. The cylindrical member 12 is filled with oil, and constitutes an oil reservoir for the jack. Threaded into a recess formed in the base of the recess 20 is a plunger cylinder 23, which cylinder is adapted to receive the plunger 13.

The plunger 13 comprises a solid cylindrical member of slightly smaller diameter than the interior of cylinder 23. At its lower end the plunger is provided with a portion 24 of reduced diameter, forming an annular shoulder adapted to provide an abutment for a cylindrical axially extending collar member 25 press-fitted over the reduced portion 24 of the plunger. The collar 25, preferably formed of hardened steel or the like, is slightly beveled at its upper end, as indicated at 26, to provide for guiding movement of the plunger in its reciprocation within the plunger cylinder 23. The collar 25 acts as a cross head to resist lateral pull of the hook member when the plunger approaches fully raised position.

At the lower end of the reduced portion 24 of the plunger there is provided a threaded stud member 27, about which is disposed a leather cup-shaped sealing member 28, which member is held in clamped position about the lower end of the collar 25 by means of the retaining washer 29 secured in abutting engagement therewith by means of the threaded nut 30 secured onto the threaded stud 27 at the lower end of the plunger.

At the upper end of the plunger 13, as shown in Figure 3, there is provided a projecting stud of reduced diameter, indicated at 32, which is adapted to form a centering means for the offset collar portion 33 of the flanged hook member 14. The member 14 therefore has abutting engagement against the annular shoulder formed between the stud 32 and the main body of the plunger 13.

In order to make a practical operating device, the upper end of the plunger 13 is provided with a hand hold 35 for pulling the jack member 14 quickly into approximately any desired raised position independently of the operating means for drawing liquid from the reservoir cylinder and forcing the same under pressure into the lower end of the plunger cylinder to raise the jack head. This hand hold may be in the form of a ring or bail member attached to an extension 34 on the collar 33 or of any other suitable or preferred form. This ring or bail member may also be used for carrying the jack about and to hang the jack upon a suitable hook.

The hook member 14 comprises a substantially semi-cylindrical flanged portion 36, as shown in Figure 4, which extends about and is slightly spaced from the external periphery of the reservoir cylinder 12. Inasmuch as the plunger member 13 is freely rotatable within the plunger cylinder 23, and the hook member 14 is press-fitted over the extending end of the plunger, it is apparent that the hook member 14 may be disposed in any desired angular position with respect to the jack, merely by rotating the same about the axis of the plunger. The hook member 14, provided with the depending semi-cylindrical portion 36, has a lifting foot comprising a laterally offset portion 37 terminating in an upwardly and outwardly extending hook portion 38.

As will be particularly noted in Figure 4, the hook portion 38 of the hook member 14 is substantially wedge-shaped in section, tapering from its base upwardly and outwardly toward the upper tip thereof. This, together with the outer annular surface of the curved portion 36 of the hook member, provides a substantially wedge-shaped receiving slot for receiving a bumper bar 9, an angle member, or other structural member to which the jack is to be secured for raising purposes. The hook portion 38 is provided with depending lateral flanged portions 37 forming continuations of the semi-cylindrical surface 36, whereby the hook member is reinforced against outward spreading.

Inasmuch as the sole support for the hook member is disposed substantially coaxially of the plunger 13 at the upper end 32 of the plunger, it is believed apparent that the weight to be lifted imposed upon the hook member, will be transmitted to substantially the center of the plunger 13, thereby overcoming, to a substantial extent, any tendency of the plunger to rock the jack about its base 11.

The upper end of the plunger 13 of the jack passes through a packing gland member comprising an upper guide member 40 having an annular shoulder 42 engaging the upper end of the fluid reservoir 12 for the pump, and having a central inwardly extending internally threaded boss 43 adapted to have threaded engagement about the upper end of the pump cylinder 23. Inasmuch as the lower end of the pump cylinder is threaded into the base 11, and the guide member 40 is threaded onto the upper end of this cylinder and clamped in abutting engagement against the defining edge of the cylinder 12, it will be apparent that the cylinders 23 and 12 are clamped in tight relative position, and serve to provide a compact and readily assembled jack unit.

The upper portion of the guide or gland nut 40 is provided with a threaded recess 44 adapted to receive suitable packing 45, which packing is held in position by means of the retaining nut 46 provided with a suitable kerf or kerfs 47 for tightening the same into the threaded recess 44 above the packing 45.

This forms a positive sealed packing gland and guide for the upper end of the plunger, and serves also to limit upward movement of the plunger, since the edge 26 of the collar 25 engages the inwardly extending flange portion 48 of the nut 40 when the plunger has reached its outermost position. Of course, if desired, the amount of liquid within the reservoir 12 may be controlled so that at no time will the plunger exceed, in its upper movement, a predetermined distance, whereby positive assurance is provided that no shackling or binding of the plunger with respect to the upper end of the cylinder will be produced.

Referring now again to Figure 2, in the operation of the jack the operating handle 15 is engaged in a suitable socket 50 carried by the rocking beam member 16. The inwardly extending end of the handle 15 is provided with spaced radially extending pins 52, which are guided through suitable slots cut in the peripheral edge of the socket, and the handle 15 may then be rotated slightly to lock the pins within the annular groove in the socket, whereby displacement of the handle 15 from the socket will be prevented.

The rocking beam 16 is suitably supported for rocking movement upon a pivot 53 comprising a pivot pin member extending between the shoulders 17 formed on the base 11. A suitable stop pin 54 is provided, for limiting upward rocking movement of the beam 16, the end of the rocking beam being provided with an offset stop projection 55 adapted to engage the stop pin 54. The offset shoulders 18 of the rocking beam are adapted to carry a suitable pin 56 extending therebetween, which pin forms a pivotal support for the piston 19, this plunger being guided within a suitable cylinder 57 formed in the base 11. The piston is of the usual construction, being provided with a leather gasket member 58 at the inner end thereof, and being guided through suitably sealed bushing means threading into the outer extending end of the cylinder 57. Upon upward movement of the member 19 outwardly of the cylinder 57, a ball check valve is adapted to be displaced by the suction created to allow the flow of oil from the reservoir defined by the annular space in the cylinders 12 and 23 into the cylinder 57. Downward movement of the plunger 19 is then adapted to displace a second ball check valve, shown somewhat diagrammatically at 59, providing for flow through a passage, not shown, into the lower end of the cylinder defined by the tubular member 23, and against the lower end of the plunger 13. Upon continued reciprocation of the piston 19, therefore, oil will flow from the reservoir cylinder 12 through the cylinder 57 and into the lower end of the plunger cylinder 23, whereby the pressure of this oil will be effective for raising the plunger in a well known manner. Suitable and well-known release valve means (not shown) may be provided for releasing the pressure of the oil in the plunger cylinder when it is desired to lower the jack, and this oil can then flow back into the reservoir 12 in the usual manner.

It is therefore believed apparent that I have provided a hydraulic jack for use especially with vehicles or the like, comprising a jack member having an axially extensible plunger operated by fluid pressure, which plunger is provided with a suitable overhanging hook member offset a slight distance from the external periphery of the jack, which is adapted to hook under any desired structural element of a vehicle or the like for the purpose of raising the same. The axial extent of the hook member 14 with respect to the plunger 13 can be varied as desired, and the specific manner in which the pressure is transmitted to the plunger cylinder may be varied without in any manner departing from the underlying principles of the present jack construction.

Having therefore described my invention in accordance with the patent statutes, what I claim as new and desire to secure by Letters Patent is:

1. In a jack of the class described, the combination of a jack cylinder, a plunger operable within said cylinder, a depending jack head rigidly attached to the top of said plunger and supported and guided solely by the plunger throughout its range of operation, a lifting foot on the depending part of said jack head, and an enlarged and elongated portion on the lower end of the plunger and bearing on said jack cylinder to act as a crosshead within the jack cylinder to sustain all lateral stresses imposed by loads on the lifting foot of the jack head, said jack head being adapted to be turned through 360° about the axis of the plunger in all of its raised and lowered positions and the path of turning movement of said jack head being entirely unobstructed throughout the range of operation of said jack head.

2. In a jack of the class described, the combination of a base, an upright reservoir cylinder supported upon said base, a plunger cylinder disposed within said reservoir cylinder and supported upon said base, a plunger operable within said plunger cylinder, a depending jack head rigidly attached to the top of said plunger and supported and guided free and clear of said reservoir cylinder and solely by the plunger throughout its range of operation and to positions with its lower end raised above the top of the reservoir cylinder, a lifting foot on the depending part of said jack head, and an enlarged and elongated portion on the lower end of the plunger and bearing on said jack cylinder to act as a crosshead within the plunger cylinder and sustain all lateral stresses imposed by loads on the lifting foot of said jack head and entirely independently of said reservoir cylinder.

3. In a jack of the class described, the combination of a base, an upright reservoir cylinder supported upon said base, a plunger cylinder disposed within said reservoir cylinder and supported upon said base, a plunger operable within said plunger cylinder, a depending jack head rigidly attached to the top of said plunger and supported and guided free and clear of said reservoir cylinder and solely by the plunger throughout its range of operation and to positions with its lower end raised above the top of the reservoir cylinder, a lifting foot on the depending part of said jack head, and an enlarged and elongated portion on the lower end of the plunger and bearing on said jack cylinder to act as a crosshead within the plunger cylinder and sustain all lateral stresses imposed by loads on the lifting foot of said jack head and entirely independently of said reservoir cylinder, said reservoir cylinder being entirely unobstructed about its periphery throughout the range of operation of the jack head and said jack head being adapted to be turned through 360° about the axis of the plunger in all of its raised and lowered positions.

4. In a jack of the class described, the combination of a base, an upright reservoir cylinder supported upon said base, a plunger cylinder disposed within said reservoir cylinder and supported upon said base, a plunger operable within said plunger cylinder, a depending jack head rigidly attached to the top of said plunger and supported and guided free and clear of said reservoir cylinder and solely by the plunger throughout its range of operation and to positions with its lower end raised above the top of the reservoir cylinder, a lifting foot on the depending part of said jack head, an enlarged and elongated portion on the lower end of the plunger and bearing on said jack cylinder to act as a crosshead within the plunger cylinder and sustain all lateral stresses imposed by loads on the lifting foot of said jack head and entirely independently of said reservoir cylinder, said reservoir cylinder being entirely unobstructed about its periphery throughout the range of operation of the jack head and said jack head being adapted to be turned through 360° about the axis of the plunger in all of its raised and lowered positions, and said jack head being arched in cross section to give the same adequate strength to support the loads imposed upon the hooked portion of said jack head solely by the attachment of said jack head to said plunger.

5. In a jack of the class described, the combination of a base, an upright reservoir cylinder supported upon said base, a plunger cylinder disposed within said reservoir cylinder and supported upon said base, a plunger operable within said plunger cylinder, a depending jack head attached to the top of said plunger and supported and guided by said plunger, the lower end of said jack head being positioned about midway between the top and bottom of the reservoir cylinder when said jack head is in fully lowered position, a load engaging portion on the lower end of said jack member, and operating means associated with the base and disposed below the lower end of said depending jack head whereby said jack head may be turned through 360° about the axis of the plunger in all of its raised and lowered positions.

6. In a jack of the class described, the combination of a base, an upright reservoir cylinder supported upon said base, a plunger cylinder disposed within said reservoir cylinder and supported upon said base, a plunger operable within said plunger cylinder, a jack head carried by the top of said plunger and adapted to be turned through 360° about the axis of the plunger in all of its raised and lowered positions, operating means for drawing liquid from said reservoir cylinder and forcing same under pressure into the lower end of said plunger cylinder to raise said jack head, a hand hold for pulling the jack head quickly into approximately any desired raised position independently of said operating means, and means for releasing the pressure in the plunger cylinder to permit lowering of said jack head.

7. In a jack of the class described, the combination of a base, a plunger cylinder on said base, a plunger operable within said cylinder, a depending jack head rigidly attached to the top of said plunger, a lifting foot at the lower end of said depending head, means including a pump housing carried by said base for raising said plunger, said jack head adapted to be turned through 360° about the axis of the plunger in all of its raised and lowered positions, and said pump housing being disposed clear of the path of turning movement of the depending jack head in all positions of said head and plunger.

8. In a jack of the class described, the combination of a base, an upright plunger cylinder secured at its lower end to said base, a reservoir cylinder supported upon said base and surrounding said plunger cylinder, a plunger rod slidable vertically in said plunger cylinder, a jack head rigidly attached to the top of said plunger rod and having a depending part extending down externally along said reservoir cylinder when the plunger is in lowered position and movable up to position clear of the upper end of said reservoir cylinder in the raised positions of said plunger rod, the depending part of said jack head being supported and guided free and clear of the reservoir cylinder and solely by the plunger throughout its range of operation, a lifting foot on the lower end of the depending part of said jack head, means including a pump housing for drawing fluid from said reservoir cylinder and forcing same against the bottom of said plunger rod to raise the same, said jack head being adapted to be turned through 360° about the axis of the plunger rod in all of its raised and lowered positions, said pump housing being disposed clear of the path of turning movement of the depending part of the jack head in all positions of said head, and an enlarged and elongated portion on the lower end of the plunger rod and bearing on the inner surface of the plunger cylinder to sustain all lateral stresses imposed by loads on the lifting foot of the jack head.

9. In combination in a jack of the class described, a base, an upright reservoir cylinder supported upon said base, a plunger cylinder disposed within said reservoir cylinder and supported upon said base, a plunger operable within said plunger cylinder, a depending head structure rigidly attached to said plunger and otherwise out of contact with the remainder of the jack, said head structure being guided and supported solely by said plunger throughout its range of operation.

10. In a jack of the class described, the combination of a base, an upright reservoir cylinder supported upon said base, a plunger cylinder disposed within said reservoir cylinder and supported upon said base, a plunger operable within said plunger cylinder, a depending jack head rigidly attached to the top of said plunger and supported and guided free and clear of said reservoir cylinder and solely by the plunger throughout its range of operation and to positions with its lower end raised above the top of the reservoir cylinder, a load engaging portion on the depending part of said jack head, and a bearing head on the lower end of the plunger and a substantial distance below the load engaging portion on the depending part of the jack head, said bearing head bearing on the interior of the plunger cylinder and acting to sustain all stresses imposed by loads on the load engaging portion of the jack head throughout the range of operation of said jack head, including the positions in which the lower end of the jack head is raised above the top of the reservoir cylinder.

11. In combination in a jack of the class described, a base, a reservoir cylinder, two telescoping members, one a plunger cylinder for receiving pressure fluid and the other a plunger rod extending into said plunger cylinder, disposed within said reservoir cylinder, one of said members being attached to said base and the other of said members being movable lengthwise of said one member, a jack head connected to the upper end of said other member for movement therewith and turnable about the axis thereof through an arc of 360°, and means for forcing fluid from said reservoir cylinder into said plunger cylinder at one end thereof between the latter and the adjacent end of said rod, said rod being provided at said adjacent end thereof with packing means forming a fluid tight closure with the interior of said plunger cylinder, said rod also having a guide element of increased diameter extending lengthwise thereof from adjacent said packing means and fitting snugly the interior of said plunger cylinder, said guide element being of appreciable length and effective as a cross-head for guiding said movable member and bracing it against lateral stresses, said rod being of reduced diameter for the major portion of its length and out of contact with the interior of said plunger cylinder.

12. In combination in a jack of the class described, a base, a reservoir cylinder, two telescoping members, one a plunger cylinder for receiving pressure fluid and the other a plunger rod extending into said plunger cylinder, disposed within said reservoir cylinder, one of said members being attached to said base and the other of said members being movable lengthwise of said one member, a jack head connected to said other member for movement therewith, and means for forcing fluid from said reservoir cylinder into said plunger cylinder at one end thereof between the latter and the adjacent end of said rod, said rod being provided at said adjacent end thereof with packing means forming a fluid tight closure with the interior of said plunger cylinder, said rod also having a guide element of increased diameter extending lengthwise thereof from adjacent said packing means and fitting snugly the interior of said plunger cylinder, said guide element being of appreciable length and effective as a cross-head for guiding said movable member and bracing it against lateral stresses, said rod being of reduced diameter for the major portion of its length and out of contact with the interior of said plunger cylinder.

13. In combination in a jack of the class described, a base, a reservoir cylinder, a telescoping plunger cylinder and plunger rod disposed within said reservoir cylinder, said plunger cylinder being attached to said base, said plunger rod being provided at its lower end with packing means forming a fluid tight closure with the interior of said plunger cylinder, said rod also having a guide element of increased diameter extending lengthwise thereof from adjacent said packing means and fitting snugly the interior of said plunger cylinder, said guide element being of appreciable length and effective as a cross-head for guiding said plunger rod and bracing it against lateral stresses, said rod being of reduced diameter for the major portion of its length and out of contact with the interior of said plunger cylinder, and a lifting head connected to the upper end of said plunger rod for movement therewith.

14. In a jack for use with a vehicle having a bar secured to a sprung part of the vehicle structure, a lift head, and means for raising and lowering the same, said head having a depending portion and a hook element extending from said portion at upward and outward inclination and defining therewith a passage for reception of the bar, said passage being open at its top, and flaring upward and from its center toward each side, to permit of relative tilting of the bar and the head in any direction in the use of the jack.

15. In a jack, a lift head, and means for raising and lowering the same, said head having a depending portion of arcuate cross-section and an off-set hook element extending at an upward and outward inclination to said portion, the inner face of said element being curved transversely and oppositely to the curvature of said depending portion, said hook element and said depending portion of said head defining a passage open at its top and flaring upward and toward each side.

GOTHARD G. HEIN.